Jan. 3, 1956 I. L. AUERBACH ET AL 2,729,808

PULSE GATING CIRCUITS AND METHODS

Filed Dec. 4, 1952

INVENTORS
ISAAC L. AUERBACH
JOHN O. PAIVINEN
Laurence R. Brown
ATTORNEY

United States Patent Office 2,729,808

Patented Jan. 3, 1956

2,729,808

PULSE GATING CIRCUITS AND METHODS

Isaac Levin Auerbach, Philadelphia, and John Oliver Paivinen, Aldan, Pa., assignors to Burroughs Corporation, Detroit, Mich., a corporation of Michigan Application December 4, 1952, Serial No. 324,115

12 Claims. (Cl. 340—174)

This invention relates to electronic switching circuits and methods and more particularly it relates to gating circuits responsive to electronic priming pulses arriving in a fixed time relationship with electronic signal pulses to be gated.

Waveform operations such as used in electronic computer circuits frequently utilize electronic switches for providing output signals during specified time intervals. Different types of electronic circuits have been evolved in the prior art for electronically switching a desired signal pulse in response to a timed priming pulse. Many of these circuits, however, involve fragile circuit elements, such as electronic tubes, and associated complex circuitry which is expensive and not reliable under a variety of operating conditions. In these circuits coincident input pulses from both a gating source and a signal source are generally required as a gating condition. A time delay may, however, be inherently introduced into one of the pulse sources thereby causing phasing difficulties. This sometimes results in erroneous indications because of non-coincidence, or may require expensive phase compensation networks. It is desirable therefore to provide a single inexpensive electronic switch circuit in which two input signal pulses may arrive in coincidence, at different times, or in a fixed time sequence.

Switching circuits should provide output pulses which are not dependent upon amplitude, waveform or coincidence of the input gating or signal pulses for the resulting output pulse amplitude or shape. To provide a substantially standardized output pulse independent of the input energy, magnetic elements similar to those publicized in an article entitled "Magnetic triggers" in the June 1950 issue of the Proceedings of the I. R. E., and used in positive transfer type shift registers as suggested by A. D. Booth in the "Electronic Engineering" December 1950 article entitled "An electronic digital computer," are utilized in the present invention.

Static magnetic elements of the type described are physically rugged and inexpensive in construction. In general, they comprise a transformer about the size of a wedding ring with a core material of a substance having a substantially rectangular hysteresis characteristic and tending to remain in a permanent magnetic remanence condition. Such static magnetic elements, when excited by a signal providing a saturating flux in either direction, cause the core to assume the corresponding magnetic remanence condition. Little current will be induced in windings of the transformer by input signals of the polarity tending to establish the same remanence condition of the core. However, when the input signal is of an opposite polarity, a high current is induced and an output signal is developed in all windings upon the core. In this manner, the elements may be utilized as bistable elements wherein the magnetic elements, when constructed with a core having a substantially rectangular hysteresis characteristic, provide a very small output signal in response to a given polarity input signal when in one remanence condition as compared with the other remanence condition.

A gating circuit utilizing the aforedescribed elements must be stable in operation and must operate only when a desired priming pulse is provided. Accordingly, precautions must be taken to prevent any unwanted pulses from establishing a priming condition. In this manner the operational requirements of the magnetic elements as gates are substantially different than when used as elements of a magnetic shift register. For this reason magnetic gating circuits utilizing remanence characteristics have not been successful in the prior art. Other types of magnetic gating circuits have rather been utilized such as those described in the above mentioned Booth article.

In accordance with the principles of the present invention, therefore, a switching circuit is provided comprising a core or body of material with a substantially rectangular hysteresis characteristic with means provided for causing the body to assume a primed remanence condition near one hysteresis characteristic limit in response to a priming or gating pulse. A signal pulse thereafter is caused by suitable means to establish remanence of opposite polarity in the body by causing it to traverse the hysteresis path to a state near the other hysteresis characteristic limit in response to signal pulses of a polarity opposite that of the gating pulses. Since an output pulse is generated only by a signal of opposite polarity than remanence, gating of the signal pulse is caused to occur only when preceded by a corresponding priming pulse by circuit means establishing an unprimed state in the absence of signal energy, thereby satisfying the conditions for an electronic switch.

It is, therefore, an object of the invention to provide improved electronic switching circuits and methods.

It is another object of the invention to provide electronic gating circuits operable with magnetic elements, or the like, having substantially rectangular hysteresis characteristics.

A further object of the invention is to provide electronic gating circuits in which priming pulses and signal pulses may arrive either in coincidence or at different times.

Other objects and features of advantage of the invention will be found throughout the following detailed description of the invention, its organization and its mode of operation. The description may be more readily understood when considered in connection with the accompanying drawing, in which:

Fig. 1*a* is a schematic diagram of a static magnetic element circuit operable in accordance with the principles of the present invention;

Figure 1*b* is a modification of the invention shown in Figure 1*a*;

Figure 1:
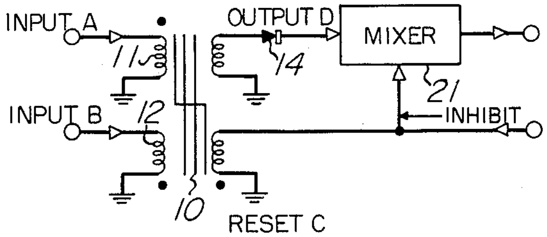

A static magnetic element of the type hereinbefore described is schematically illustrated in Fig. 1*a*, wherein the magnetic core material 10 readily assumes one of two opposite states of magnetic remanence in accordance with signals connected to various transformer windings which may be wound about the core 10. It is to be assumed for purpose of description and not limitation throughout the ensuing specification that the input signals are always of an amplitude sufficient to establish a state of remanence of a polarity corresponding to that of the input signal.

Any suitable input circuit may be utilized for exciting the core material. The dot notation on the two separate input windings 11 and 12 of the transformer indicates that the input signals A and B will establish remanence of opposite polarities in the magnetic core 10. Likewise, reset signal C will establish a polarity similar to the input signal B. Properly gated output signals D may be selected to have either polarity by properly poling the unidirectional device 14, connected in series with the output winding of transformer 10. Suitable pulse generating circuits such as found in the electronic computer art may be used to derive the input signals A, B and reset pulses C. To properly operate as a gating circuit, the device must only be primed by the desired pulses with no possibility of priming by unwanted pulses. The series rectifier 14 prevents any pulses from a succeeding circuit from entering the output winding to prime the gate and cause erratic gating operation.

Figures 1B, 2:
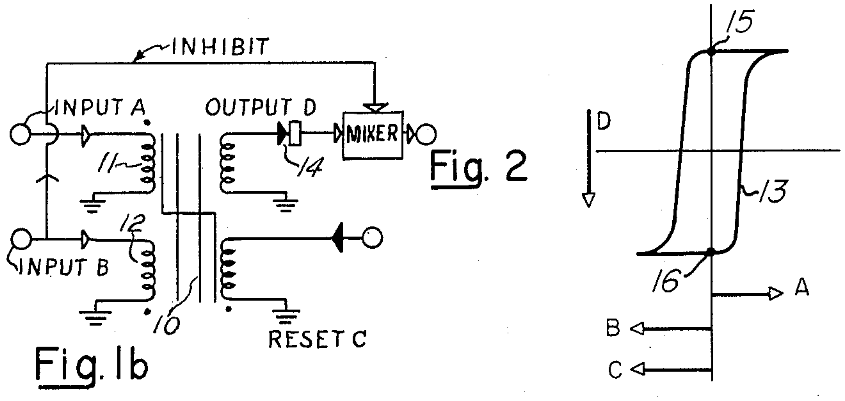
Fig. 2 is a graphical representation of hysteresis characteristics and associated signals illustrating the principles of operation of the invention.

In Fig. 2 arbitrarily shown polarities are graphically associated with the rectangular hysteresis curve 13 to indicate the operation of the circuit. Thus, the input signal A establishes a remanence condition at the upper position 15 on the hysteresis curve 13. Conversely, the input signals B or C drive the core into the remanence condition at lower position 16. As hereinbefore explained, output signals may be derived when the remanence condition of the core is changed from one polarity to another. Accordingly, the rectifier 14 is used in combination with the transformer and is poled so that an output signal D is derived only when the remanence condition is changed from the upper position 15 to the lower position 16 (or vice versa if the rectifier polarity is changed). The priming signal must be of a single polarity so that rectifier 14 serves to prevent any feedback pulses of the priming polarity from causing instability.

Figures 3, 4:
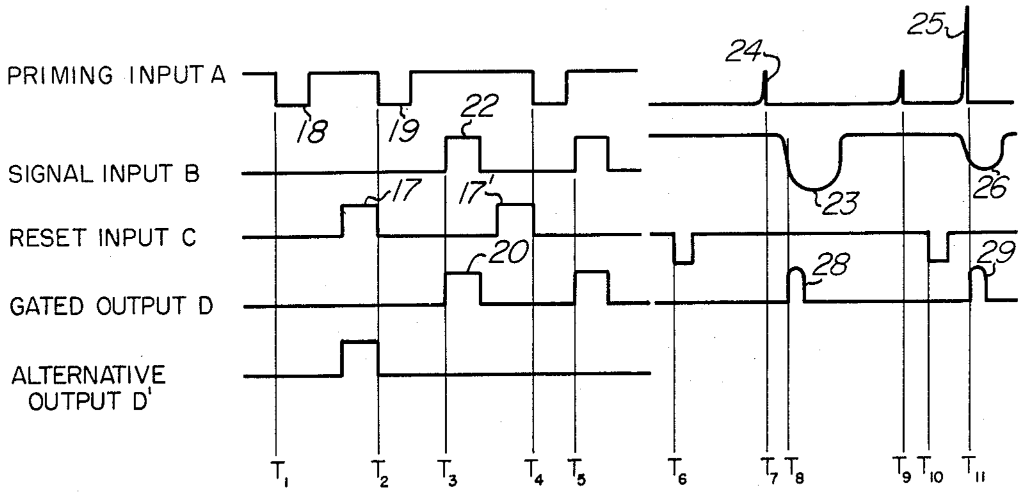
Figs. 3 and 4 are waveform charts illustrating the operation of circuits constructed in accordance with the invention.

Operation of the circuit with signals shown in Fig. 3 therefore causes one storage condition to be assumed in response with priming or gating input signals A, which may either be randomly interspersed pulses or cyclically repetitive pulses depending upon the field of application. The signal input pulses B and reset input pulses C are both of opposite polarity to the priming pulses as hereinbefore indicated in Fig. 2.

Consider operation after the initial priming pulse 18 establishes remanence at the upper position 15 of Fig. 2. Since there is no signal input B before the second priming pulse 19, there is no gated output signal D established before the time $T_2$. However, an alternative output signal D′ is excited before time $T_2$ of the second priming pulse 19 by the initial reset input pulse 17 which causes remanence to change from upper position 15 to the lower position 16 on the hysteresis characteristic. This alternative output signal may be used as an indication of gating absence if desired and in that manner performs the logical "not" function. If not used, the alternative output excited just before the time $T_2$ may not be objectionable in a time discriminatory load only operable during a different time. However, if objectionable, means such as designated in Fig. 1*a* may be used to cancel or inhibit the output signal D′ in the output circuit. A mixing network 21 therefore is actuated by the reset pulse in equal amplitude and opposite polarity to the alternative output pulse and coincident therewith to effect cancellation.

The reset input pulses are shown provided in time sequence between the signal ($T_3$) and adjacent subsequent priming pulses ($T_4$) so that subsequent signal input pulses 22, etc. will not provide output pulses 20, etc. in the absence of a prior priming pulse 19, etc. interspersed between consecutive reset and signal pulses 17 and 22. This is necessary since, in gating circuits, the signal pulses generally occur randomly with respect to the priming pulses. Either the signal pulses or priming pulses may be cyclic in character however. Thus, a signal input pulse 22 occurring after the corresponding priming pulse 19 will generate the gated output signal D in a magnetic element as shown in Fig. 1 because of a change in the remanence condition of the core material from the upper state 15 to the lower state 16 of Fig. 2. After this operation the second reset input pulse 17′ causes no change of condition since it is of the same polarity as the input signal 22. With a gated output signal 20 therefore produced, no alternative gated output signal occurs and no cancellation is necessary. It is to be recognized that should the alternative output signal D′ be used and gated output signal D be undesirable, the input signal B could be used to cancel output pulses D in the mixing circuit 21 rather than the reset signal C. Figure 1*a* shows that embodiment of the invention wherein such inhibition takes place and gated output pulses are blocked by the presence of input signal B. Figure 1*b* is similar to Figure 1*a* save for the location of the inhibition circuit.

It is noted that coincidence of the input pulses A, B, or C does not have to occur but that they may respectively arrive in time sequence $T_1$, $T_2$, $T_3$ etc. This is possible because of the storage condition of the core material used. Should some of the pulses arrive in coincidence however as the priming pulse 25 and the elongated signal pulse 26 of Fig. 4, a suitable gated output pulse 29 will be excited. The present circuit, therefore, operates either as a coincidence or a sequential gating circuit, subject in all cases to a priming pulse to gate the output energy.

Because of the saturable characteristics of the static magnetic elements hereinbefore noted, substantially the same amplitude and wave shape output pulse is provided by any signal which changes the remanence condition from one position to the other. Accordingly, the amplitude or wave shapes of the signal pulses B or priming pulses A have very little effect upon the output pulses D or D′. Therefore, consider the gated output pulses 28 and 29 at times $T_8$ and $T_{11}$ in Fig. 4 as derived after priming pulses 24 and 25 arrive respectively at times $T_7$ and $T_{11}$. The output and input pulses 23 and 28 coincide in time as a result of the gating action. Therefore, in accordance with this aspect of the present invention the output waveform is substantially independent of coincidence or amplitude and waveform variations of the input pulses.

Figure 5:
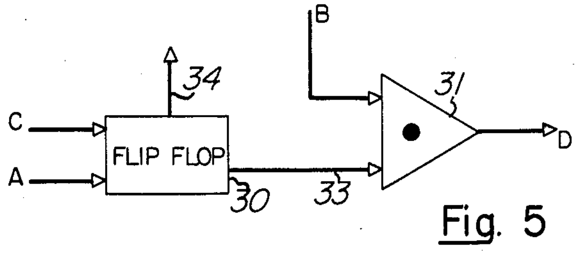
Fig. 5 is an equivalent circuit block diagram illustrating the general operating principles of the invention.

The equivalent circuit of Fig. 5 illustrates the general operational principle of the present invention. A flip flop circuit 30 having two stable states of operation represented at respective output leads 33 and 34 is respectively established in the set condition by the priming input pulses A and the reset condition by input pulses C. Thus, a storage condition is established to hold terminal 33 at one input lead to the succeeding conjunctive or "and" (·) circuit 31 in a gating condition until a succeeding reset pulse C arrives. Thus, the signal A will cause the primed condition to prevail until a reset signal C occurs. Accordingly, the signal input pulse B arriving at the conjunctive circuit 31 only during this time will provide an output signal D. The simplified transformer of the invention therefore operates as a primed gate or a combination of a flip flop circuit and a coincidence circuit.

The present invention, therefore, provides improved electronic gating circuits utilizing an electrically responsive body of material with substantially rectangular hysteresis characteristics. Electrical signal pulses are gated in accordance with the present invention by means exciting a fixed storage condition in the electrically responsive body in response to a priming input pulse, then exciting a storage condition of opposite polarity in the element in response to a signal pulse which thereby is gated. Resetting of the element in the opposite polarity in the time interval between the signal pulses and the priming pulses assures that signal pulses are only gated when corresponding priming pulses are interspersed between the reset and signal pulses.

Having thus described the invention and its mode of operation, it is clear that certain modifications may be suggested to those skilled in the art which do not depart from the spirit or scope of the invention since the embodiments have been intended to clearly show the manner of operation rather than the possible variations. Those features believed indicative of the nature and scope of the invention are described with particularity in the appended claims.

What is claimed is:

1. A primed gate circuit comprising, a body of material having a substantially rectangular hysteresis characteristic and remanence qualities, means for establishing a remanence of one polarity in said body in response to a series of priming signal pulses, means for establishing a remanence of the opposite polarity in said body in response to a series of signal pulses which are spaced in time from the priming signal and occur randomly with respect to the priming pulses, one of said series of pulses being cyclic in nature, and a series of cyclic reset pulses for establishing an unprimed remanence condition in said body to assure a gated output pulse only in presence of a priming pulse.

2. A circuit as defined in claim 1 including an inhibiting circuit for preventing gated signals in response to the reset pulses.

3. An electronic circuit comprising, a body of material with a substantially rectangular hysteresis characteristic, means causing the body to assume a primed state near one hysteresis characteristic limit in response to a priming signal, means thereafter causing the body to traverse the hysteresis path to a state near the other hysteresis characteristic limit in response to signal energy to afford gating of the signal energy, and reset means to establish an unprimed state in the absence of signal energy whereby a successive signal may only be primed by a corresponding priming signal.

4. An electronic gating circuit comprising in combination, a static element having two stable remanence conditions established in response to electrical signal pulses of opposite polarities, a first priming signal pulse energy source adapted to establish remanence in a first polarity, a source of signal energy to be gated by said priming pulse adapted to establish remanence in the other polarity, a source of reset signals, and means including an inhibiting circuit for deriving a gated output signal from said element responsive to the reset signals only upon changes of remanence from the first polarity to the other polarity.

5. The method of gating electrical signal pulses comprising the steps of exciting a storage condition of a first polarity in an electrically responsive element in response to a priming pulse, exciting a storage condition of an opposite polarity in said element in response to a signal pulse to be gated, and applying resetting energy to the element in said opposite polarity between the signal pulse and the next successive priming pulse, said resetting energy being effective to switch the core to said opposite polarity should said signal pulse not be present between said first excitation step and said application of resetting energy.

6. A primed gate circuit comprising, a static magnetic element having two input winding circuits, a priming circuit connected in one winding circuit to deliver priming pulses of a first polarity, a signal circuit connected in the other winding circuit to deliver signal pulses of opposite polarity, means deriving an output signal from said element in response to signal pulses only when said element has been previously excited by priming pulses, and further input means for sequentially inserting reset pulses between said signal pulses and said priming pulses.

7. An electronic circuit comprising, a storage element, means storing one polarity in said element in response to a cyclic seequence of priming pulses, means reversing the storage polarity of said element in response to signal pulses occurring after the priming pulses, and cyclic resetting means tending to establish said reversed polarity time sequentially between said signal and priming pulses whereby reversal of polarity of said element by said resetting means occurs only when a signal pulse does not follow a priming pulse.

8. The combination of a bistable condition storage device, a conjunctive circuit responsive to two input signals wherein the conjunctive circuit has one input signal derived from a predetermined storage condition in said storage device, a signal circuit coupled to provide the other input signal to said conjunctive circuit, and means for resetting the storage device in a predetermined state of operation sequentially between said two input signals.

9. The combination as defined in claim 8 wherein the storage device is a static magnetic element having two input winding circuits adapted for receiving said two input signals in opposite polarities, and wherein the means for selectively establishing the storage device in one state of operation comprises a reset winding circuit coupled to said element.

10. A conjunctive circuit comprising, an element of material having a substantially rectangular hysteresis characteristic and remanence qualities, means providing two sets of intermittently spaced signal pulses, means for establishing opposite remanence polarities in said element in response to each set of signal pulse excitations, means for resetting the element in one of said polarities in time sequence between the two spaced signal pulses, and means deriving an output signal due to a change of remanence in said element in response to one set of signal pulses.

11. An electronic gating circuit comprising a bistable state magnetic element, two input pulse sources coupled to said bistable element for providing signal pulses of such amplitude to effect changes in the state of the bistable element, said signal pulses occurring at different times during a read-in cycle for said element, one source of signal pulses operable to cause the bistable element to switch from a selected state to a non-selected state, the second source of signal pulses operable to cause the bistable element to switch from the non-selected state to the selected state, an output circuit coupled to the magnetic element and responding to the switching of the element from the non-selected state to the selected state to produce an output pulse, and an inhibit circuit for preventing output pulses in the output circuit during the read-in cycle as the element is switched to its selected state, and means for switching the element to its selected state subsequent to the read-in cycle to produce an uninhibited signal in said output circuit when said means finds the element in its non-selected state.

12. An electronic gating circuit comprising a bistable state magnetic element, two input pulse sources associated with said bistable element for providing signal pulses of such amplitude to effect changes in the state of the bistable element, said signal pulses occurring at different times during a read-in cycle for said element, circuit means coupling the sources to the bistable element so that signals from both sources are required during a first period to switch the bistable element from an unselected state to a selected state, output circuit means associated with the bistable element and responsive to the switching of the bistable element to the selected state to tend to produce an output pulse, means for switching the element to the selected state in a second period subsequent in time to the read-in cycle to tend to produce a signal in said output circuit means, and inhibit circuit means for preventing output pulses in the output circuit means during one of said periods as the bistable element is switched to its selected state.

References Cited in the file of this patent

UNITED STATES PATENTS

| | | |
|---|---|---|
| 2,590,950 | Eckert | Apr. 1, 1952 |
| 2,609,143 | Stibitz | Sept. 2, 1952 |

OTHER REFERENCES

Association for Computing Machinery, Proceedings 1952, pp. 223–229.